US010437716B2

(12) United States Patent
Guralnik et al.

(10) Patent No.: US 10,437,716 B2
(45) Date of Patent: Oct. 8, 2019

(54) METHOD AND APPARATUS FOR COVERAGE ANALYSIS OF SRT LOOK-UP TABLE

(71) Applicant: International Business Machines Corporation, Armonk, NY (US)

(72) Inventors: Elena Guralnik, Haifa (IL); Haim Kermany, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 15/341,539

(22) Filed: Nov. 2, 2016

(65) Prior Publication Data

US 2018/0121341 A1    May 3, 2018

(51) Int. Cl.
 *G06F 11/36* (2006.01)
 *G06F 7/52* (2006.01)
 *G06F 7/535* (2006.01)

(52) U.S. Cl.
 CPC ............ *G06F 11/3692* (2013.01); *G06F 7/52* (2013.01); *G06F 7/535* (2013.01); *G06F 11/3664* (2013.01); *G06F 11/3684* (2013.01); *G06F 11/3688* (2013.01)

(58) Field of Classification Search
 CPC .................................................. G06F 11/3676
 See application file for complete search history.

(56) References Cited

U.S. PATENT DOCUMENTS

| 2010/0131143 A1* | 5/2010 | Xu ...................... G06F 11/3684 701/33.1 |
| 2013/0019216 A1* | 1/2013 | Vasudevan ............ G06F 17/504 716/106 |

OTHER PUBLICATIONS

H.Ruess, et al., Modular Verification of SRT Division, Formal Methods in System Design 14, 1999. p. 45-73 (Year: 1999).*
H. Chocker, et al., Coverage in Interpolation-based Model Checking, DAC'10, 2010 p. 182-187 (Year: 2010).*

* cited by examiner

*Primary Examiner* — Andrew Caldwell
*Assistant Examiner* — Emily E Larocque
(74) *Attorney, Agent, or Firm* — Scully, Scott, Murphy & Presser, P.C.; Margaret A. McNamara

(57) ABSTRACT

A computer-implemented method, computerized apparatus and computer program product. The method includes receiving at a computing device, a Sweeney-Robertson-Tocher (SRT) implementation, and a look-up table (LUT) used by the SRT implementation; obtaining an assertion for the SRT, the assertion associated with at least one entry from the LUT; verifying the assertion by executing a formal verification engine on the SRT implementation. Subject to the assertion failing, the method further provides a counter example for a computation that when performed by the SRT implementation accesses the at least one entry. Further, subject to the assertion holding, the method performs determining that the at least one entry is unreachable.

20 Claims, 3 Drawing Sheets

METHOD AND APPARATUS FOR COVERAGE ANALYSIS OF SRT LOOK-UP TABLE

TECHNICAL FIELD

The present disclosure relates to analyzing the coverage of SRT look up table.

BACKGROUND

The Sweeney-Robertson-Tocher (SRT) algorithm for division and square root extraction is widely used by microprocessors. This algorithm accesses an entry in a lookup table (LUT) on every clock cycle, to provide a fixed number of result bits within the clock cycle.

As every other hardware or software component in a microprocessor, the specific implementation of the algorithm has to be checked thoroughly to ensure that no error is introduced. In particular it is highly important to check that all entries of the LUT are correct.

For simplicity, the discussion below refers to pairs of numbers for testing the division operation, but it should be understood as covering also single numbers for testing the square root operation.

Simulating the algorithm execution, and in particular checking all relevant entries of the table is a highly challenging task. For full coverage, it is required to run the algorithm with input comprising a set of pairs of numbers such that executing the algorithm on the full set will lead to each reachable entry in the table, and for certain entries at least a predetermined number of times.

In addition, it may be required to identify entries in the table which are unreachable, i.e., there is no pair of numbers that the division of which will, on any cycle, lead to these entries. By identifying and removing these entries, the LUT may be made smaller, thus reducing space consumption and increasing efficiency. In any case, identifying the unreachable entries enables testing for full coverage of the reachable entries.

Several approaches have been tried to prove the correctness of SRT based implementations of division and square root extraction. Some of these approaches ensure coverage, but at very high time and complexity requirements, and with additional simulation efforts, thus making them practically impossible. Moreover, none of these approaches was able to provide a set of inputs that ensures that every reachable entry is indeed reached, and prove that other entries cannot be reached.

There is thus a need for a method and system for identifying unreachable entries in a LUT of the SRT algorithm, ensuring coverage of the reachable entries, and providing enough input for testing that the algorithm reaches every reachable entry.

BRIEF SUMMARY

One exemplary embodiment of the disclosed subject matter is a computer-implemented method comprising: receiving a Sweeney-Robertson-Tocher (SRT) implementation, and a look-up table (LUT) used by the SRT implementation; obtaining an assertion for the SRT, the assertion associated with at least one entry from the LUT; verifying the assertion by executing a formal verification engine on the SRT implementation; subject to the assertion failing, providing a counter example for a computation that when performed by the SRT implementation accesses the at least one entry; and subject to the assertion holding, determining that the at least one entry is unreachable. The method may further comprise determining the assertion based on a coverage goal or on a requirement. The method may further comprise executing the computation by a simulator of the SRT implementation on the counter example, with the LUT. Within the method, the counter example may comprises a dividend and a divisor, or a number for which it is required to determine a square root. The method may further comprise verifying further assertions for determining further counter examples for the assertion. The method may further comprise verifying further assertions for determining coverage of advanced coverage goals. Within the method, the advanced coverage goals optionally comprise one or more goals selected from the group consisting of: verifying that a legal LUT entry is hit on any iteration, and hitting each legal LUT entry with extreme values of operands.

Another exemplary embodiment of the disclosed subject matter is a computerized apparatus having a processor, the processor being adapted to perform the steps of receiving a Sweeney-Robertson-Tocher (SRT) implementation, and a look-up table (LUT) used by the SRT implementation; obtaining an assertion for the SRT, the assertion associated with at least one entry from the LUT; verifying the assertion by executing a formal verification engine on the SRT implementation; subject to the assertion failing, providing a counter example for a computation that when performed by the SRT implementation accesses the at least one entry; and subject to the assertion holding, determining that the at least one entry is unreachable. Within the apparatus, the processor is optionally further adapted for determining the assertion based on a coverage goal or on a requirement. Within the apparatus, the processor is optionally further adapted for executing the computation by a simulator of the SRT implementation on the counter example, with the LUT. Within the apparatus, the counter example optionally comprises a dividend and a divisor, or a number for which it is required to determine a square root. Within the apparatus, the processor is optionally further adapted for verifying further assertions for determining further counter examples for the assertion. Within the apparatus, the processor is optionally further adapted for verifying further assertions for determining coverage of advanced coverage goals. Within the apparatus the advanced coverage goals optionally comprise one or more goals selected from the group consisting of: verifying that a legal LUT entry is hit on any iteration, and hitting each legal LUT entry with extreme values of operands.

Yet another exemplary embodiment of the disclosed subject matter is a computer program product comprising a computer readable storage medium retaining program instructions, which program instructions when read by a processor, cause the processor to perform a method comprising: receiving a Sweeney-Robertson-Tocher (SRT) implementation, and a look-up table (LUT) used by the SRT implementation; obtaining an assertion for the SRT, the assertion associated with at least one entry from the LUT; verifying the assertion by executing a formal verification engine on the SRT implementation; subject to the assertion failing, providing a counter example for a computation that when performed by the SRT implementation accesses the at least one entry; and subject to the assertion holding, determining that the at least one entry is unreachable.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem handled by the disclosed subject matter is the need to analyze the coverage of a Look-Up Table (LUT) used by the Sweeney-Robertson-Tocher (SRT) algorithm for division and square root extraction, which is often used by microprocessors. Testing the coverage includes determining that every reachable entry within the table is indeed reached, and proving that other entries cannot be reached, and may thus be removed from the table. Current testing techniques require simulating the processor operation on such large number of inputs, which makes it impossible for all practical purposes.

Another technical problem handled by the disclosed subject matter is the need to supply, for each reachable entry in the table, input including at least one pair of dividend and divisor, or at least one number for which it is required to extract the square root (generally referred to as the pair), such that during the operation execution the relevant entry of the LUT is accessed.

Yet another technical problem handled by the disclosed subject matter is the need for achieving advanced coverage goals, for example providing at least a predetermined number of examples for pairs for each entry, locating entries that are hit with extreme values of operands, such as operands ending with a predetermined number of 0's, operands close to the maximal value, or the like. In some embodiments, the advanced coverage goals may refer to numbers having any characteristics, such as even numbers, odd numbers, or the like.

One technical solution relates to addressing reachability and coverage problems using formal verification techniques. A framework may be created which utilizes formal verification methods for showing that some entries in the table can be hit, while proving that others cannot be reached in a given implementation, during any calculation. The framework can be adapted for obtaining a pair of numbers for each entry, such that dividing the two numbers requires accessing the relevant entry.

Another technical solution comprises further adapting the framework for obtaining multiple such pairs for one or more entries, and for providing input for additional events, such as identifying entries that are hit with extreme values of operands.

The entries identified as unreachable may be removed from the LUT in order to save storage or reduce access time.

The processor simulation may then be executed for all obtained input pairs, to determine whether the relevant entries are indeed accessed. The simulation may also check for the correctness of the result, and for its stability, i.e., whether a correct response is repeated under different circumstances.

One technical effect of the disclosure relates to testing a processor design including verifying the coverage of a LUT, using affordable time and resources, while saving resources such as space by eliminating unrequired entries.

Figure 1:
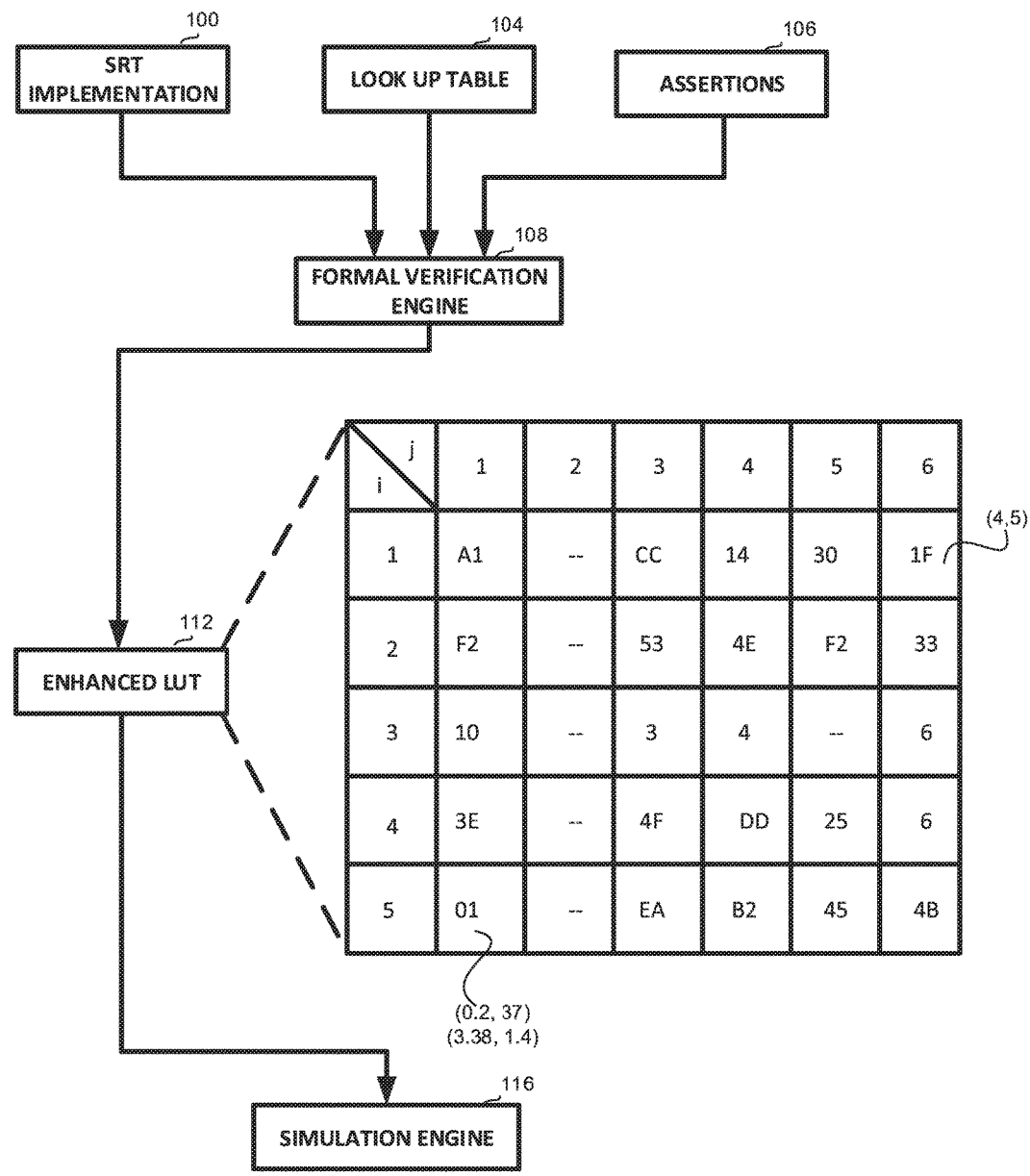
FIG. 1 shows a schematic exemplary environment for implementing and using a method and system for analyzing the coverage of SRT implementation, in accordance with some exemplary embodiments of the subject matter.

Referring now to FIG. 1, showing a schematic exemplary environment in which the disclosed subject matter is used.

The environment may comprise a formal verification engine 108, such as the FPGen Floating point test generator provided by International Business Machines of Armonk, N.Y., USA.

Formal verification engine 108 may receive as input SRT implementation 100, provided for example in Register Transfer Language (RTL) or netlist. Formal verification engine 108 may also receive as input LUT 104 used by SRT implementation 100, which may comprise N rows and M columns.

Formal verification engine 108 may process SRT implementation 100 with LUT 104, and possibly additional input such as assertions 106 which may be provided by a user, a program, retrieved from storage, or the like. The assertions may be provided as text, as binary data structures, or the like.

Formal verification engine 108 may output an enhanced LUT 112 and associated information. Enhanced LUT 112 may comprise an indication for unreachable entries, such as entry (1, 2). In some embodiments, an entire row or column, such as column 2, may be unreachable, in which case it may be omitted. In some embodiments, one or more cells which are unreachable may also be omitted.

Enhanced LUT 112 may be further associated with one or more pairs of dividend and divisor, such that the division operation requires access to the relevant entry, for each reachable entry (i,j). For example, entry (1, 6) may be reached when dividing 4 in 5, and entry (5, 1) may be reached when dividing 0.2 by 37 or 3.38 by 1.4. It will be appreciated that these numbers are not actual examples and are only intended to demonstrate the process.

Enhanced LUT 112 and the associated pairs may be provided as input to simulation engine 116, which may iterate over the provided pairs, use each pair as input, and verify that the relevant table entries are indeed accessed, and that the computation result is correct.

Figure 2:
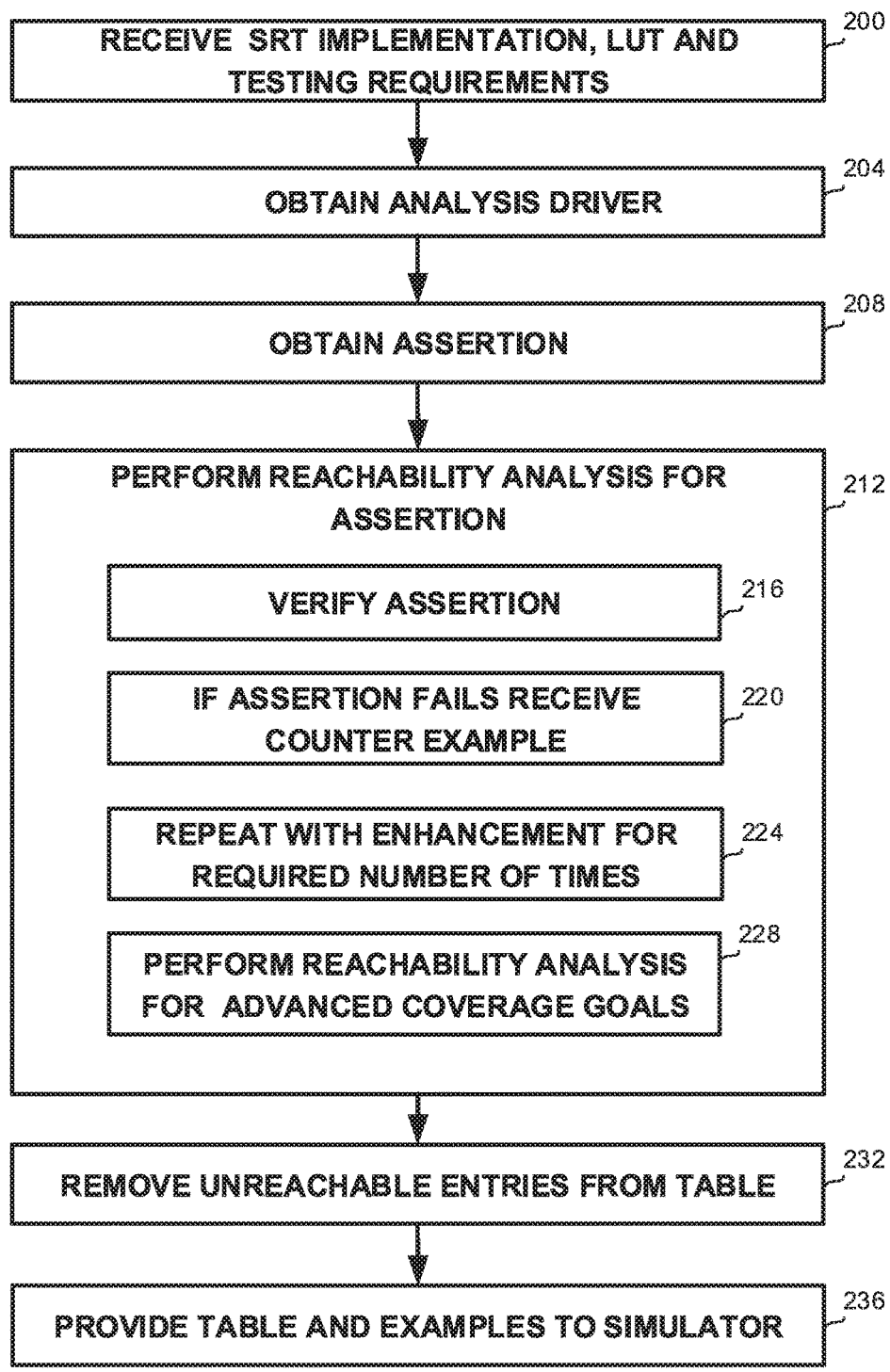
FIG. 2 is shows a flowchart diagram of a method for analyzing the coverage of SRT implementation, in accordance with some exemplary embodiments of the disclosed subject matter.

Referring now to FIG. 2, showing a flowchart diagram of a method for analyzing the coverage of SRT implementation, in accordance with some exemplary embodiments of the disclosed subject matter.

On step 200, an SRT implementation may be received, for example as a Verilog or VHDL program, for example in RTL or netlist format. The LUT required for the SRT implementation may also be received. In some embodiments, testing requirements may also be received. In default cases, wherein it is just required to provide a single pair of numbers for each entry and an indication to the unreachable entries, providing the requirements may be omitted.

On step 204, an analysis driver may be obtained, for example received from a third party, retrieved from a storage device, developed, or the like. The analysis driver may be designed such that exactly one predefined instruction (e.g., division or square root extraction of some precision) is issued by the driver at any predetermined cycle L, instruction execution is started at a fixed cycle, the instruction opcode can get only one value of the verified instruction, and the instruction operands a and b (or just a for square root extraction) may be assigned any legal value.

On step 208, one or more assertions may be obtained, which may express one or more coverage goals. The assertions may be received from a file, from a user, or the like. Alternatively, the assertions may be determined or expressed based on coverage goals or on the requirements received on step 200. The assertions may be expressed as Property Specification Language (PSL) assertions. A formal verification engine may receive each assertion, and verify whether it holds or fails for a model, such as the SRT implementation. Such verification may prove, for example, that an entry in the table is unreachable, or the engine may provide a counter example of numbers which when divided by one another the relevant entry is accessed. Thus, a basic assertion $A_1$ relating to the reachability of an entry (i, j) may be phrased as follows:

$\quad$ a. $A_1(i,j)$: never(line=$i$&column=$j$&table_access)

wherein i is in the range of 1 ... N, j is in the range of 1 ... M in the LUT, and table_access is the name of LUT access qualifier.

In some embodiments, a verification engine may be activated for testing an assertion for each entry in the LUT. In other embodiments, a single verification engine may be run sequentially for testing assertions related to all entries in the table.

In further embodiments, since a formal verification engine may test a number of assertions, and since the line index in the SRT algorithm depends on the divisor (or on the initial estimation in square root extraction) and is stable during instruction execution, then in order to boost model checking and optimize resources, the events, i.e., the LUT entries, may be divided into verification units such that a verification unit relates to a line of the LUT, and each verification unit is assigned to a formal verification engine. Once the SRT is run, it enters multiple times to the same line depending on the divisor, the entries in the same line are executed by the same verification engine. This division may reduce the cone of influence, i.e., the collection of values searched for, e.g., the divisor and dividend, or the number for which it is required to find the square root, and may significantly reduce the execution time.

On step 212 the formal verification engine may perform reachability analysis for the assertions.

On step 216, one or more assertions as obtained on step 208 may be verified. Assertions may be tested as the formal verification engine verifies the SRT implementation received on step 200. The formal verification engine may return TRUE if an assertion holds, i.e., the entry (i, j) of the LUT is indeed never accessed, and FALSE otherwise.

Since as part of the driver definition, it was defined at which cycle L the instruction is issued, and the number of cycles K needed to preprocess the input prior to the first iteration as well as the number R of SRT iterations needed to complete the chosen instruction are known, a bound B may be defined for all runs, which is equal to B=L+K+R. Due to the nature of verification, if the assertion does not fail during the first B cycles, then it will never fail, therefore it is possible but useless to run the engine for more than B cycles.

In some embodiments, the verification engine may be executed with engine configuration that performs tight bounded model checking, for example with initial checking cycle=0 and jumping step=1, and a bound on the number of cycles B.

Due to the parameter settings, if assertion $A_1(i, j)$ does not fail within the first B cycles, then it always holds, i.e., the (i, j) entry in the LUT is not reached. All assertion units may be verified, wherein each assertion unit may include one or more assertions, for example an assertion unit may comprise multiple assertions related to the same line in the table.

On step 220, if an assertion $A_1(i, j)$ fails, i.e., the (i, j) entry is reached, then a counter example may be received from the verification engine, wherein the counter example comprises a computation that when performed by the SRT implementation, accesses the relevant entry. For example a pair of numbers for a division operation and a number for square root operation may be given as counter examples.

On step 224, further counter examples may be obtained for one or more entries, by enhancing an assertion as follows: Suppose assertion $A_1(i, j)$ failed and a counter example was provided consisting of (a1, b1), then an enhanced assertion may be defined as follows:

$\quad$ a. $A_2(i, j)$: never
$\quad\quad$ (line=$i$&column=$j$&table_access&$a!=a1$&
$\quad\quad$ $b!=b1$)

wherein a and b are input operands to the instruction.

It will be appreciated that further assertions may be created as long as more counter examples are required, by requiring that at least a or b are different from previously obtained examples. If such assertion holds, then there are no more counter examples.

In alternative embodiments, a multiple of counter examples may be obtained from the verification engine in an execution.

On step 228 further reachability analysis, for example of more advanced assertions, may be performed, by providing further assertions for testing specific events, such as making sure that a legal LUT entry is reached at any iteration, for example providing a first example in which the entry (4,5) is reached at the first iteration, a second example in which the same entry (4,5) is reached at the second iteration, or the like. In another example, exemplary pairs of numbers may be looked for in which each legal entry is reached with an operand meeting a certain criteria, such as minimal or maximal value, or the like. Each such assertion is executed, and if failed, a counter example is retrieved. For example, an assertion for testing that a legal LUT entry is hit at every iteration may be tested by executing the following assertion with k changing from 1 to the number of iterations:

$\quad$ a. $A_3(i,j,k)$: never(line=$i$&column=$j$&
$\quad\quad$ table_access&iter_counter=k)

wherein iter_counter is a variable defined to count iterations.

On step 232, the unreachable entries, i.e., those entries for which the assertions held, may be removed from the LUT.

On step 236, the table and the counter examples provided for one or more entries may be supplied as input to a simulator of the SRT implementation. By having the simulator execute all provided counter examples, all reachable entries are supposed to be reached, and by comparing the division (or square root) results to the expected results, the correctness of the LUT may be verified. The simulator may perform further tests, for example executing one or more divisions multiple times at different circumstances or configurations.

Figure 3:
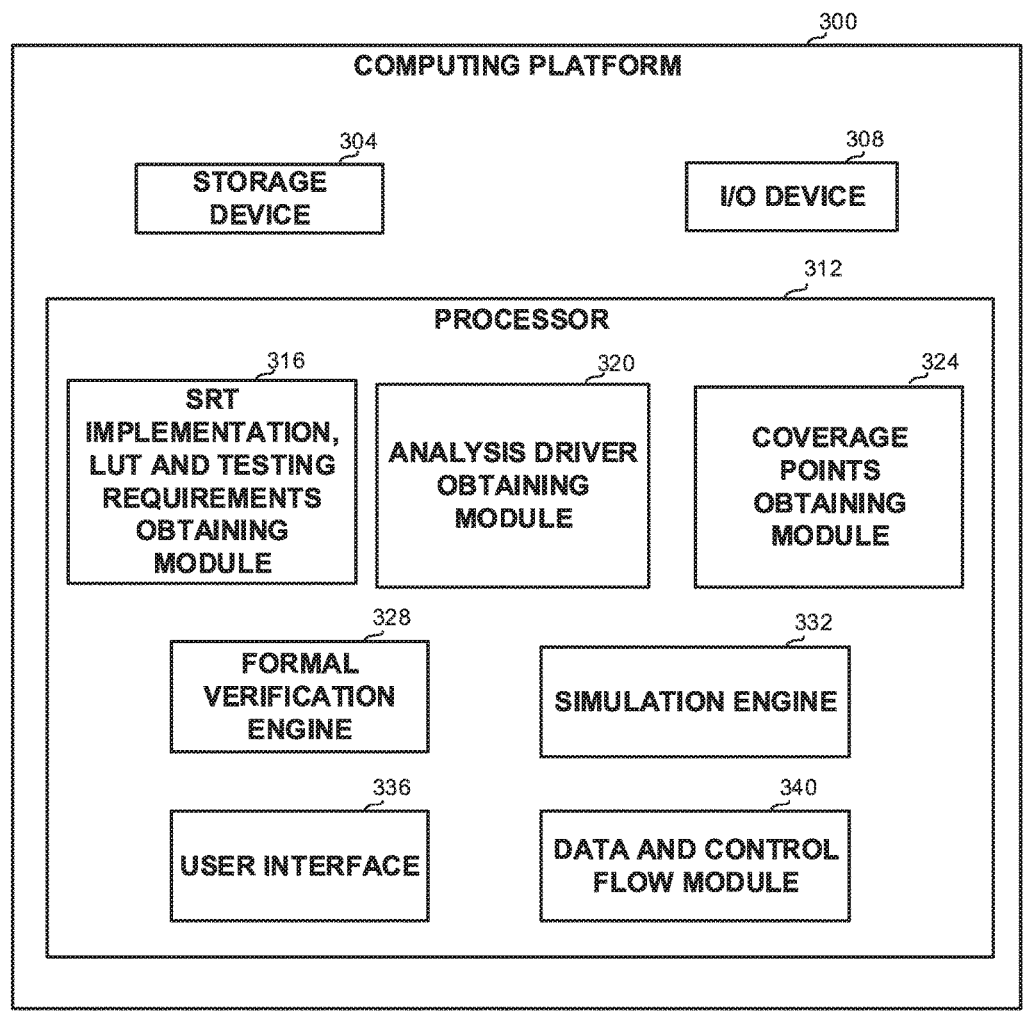
FIG. 3 shows a block diagram of an apparatus for analyzing the coverage of SRT implementation, in accordance with some exemplary embodiments of the disclosed subject matter.

Referring now to FIG. 3, showing a block diagram of an apparatus for analyzing the coverage of SRT implementation, in accordance with some exemplary embodiments of the disclosed subject matter.

The apparatus may be implemented on computing platform 300 comprising a processor 312. Processor 312 may be a Central Processing Unit (CPU), a microprocessor, an electronic circuit, an Integrated Circuit (IC) or the like. Processor 312 may be configured to provide the required functionality, for example by loading to memory and activating the modules listed below.

Computing platform 300 may also comprise a storage device 304, such as a hard disk drive, a Flash disk, a Random Access Memory (RAM), a memory chip, or the like. In some exemplary embodiments, storage device 304 may retain program code operative to cause processor 312 to perform acts associated with any of the modules listed below.

Computing platform 300 may also comprise Input/Output (I/O) device 308 such as a display, a pointing device, a keyboard, a touch screen, or the like. I/O device 308 may be utilized to provide output to and receive input from a user.

It will be appreciated that computing platform 300 may be implemented as one or more computing platforms which may be in communication with one another. It will also be appreciated that processor 312 may be implemented as one or more processors, whether located on the same platform or not.

Processor 312 may comprise or execute SRT implementation, LUT and testing requirements receiving module 316 for obtaining the SRT implementation to be verified, the LUT and optionally testing requirements.

Processor 312 may comprise analysis driver obtaining module 320 for obtaining an analysis driver, and coverage points obtaining module 324 for obtaining the required coverage points that have to be verified. Obtaining may relate to receiving or developing the analysis driver, and receiving or developing the assertions from the testing requirements.

Processor 312 may comprise formal verification engine 328, for receiving the SRT implementation, the LUT and the requirements, which may be converted to assertions automatically or manually, and executing formal verification of the SRT implementation, by verifying whether each assertion holds or providing a counter example to those that do not hold. Formal verification engine 328 operates with formal verification rather than executing each and every possible input, and can thus prove unreachability or provide counter example without simulating the testing of each such input.

Processor 312 may comprise simulation engine 332 for executing the design by using the counter examples provided by formal verification engine 328. However, it will be appreciated that simulation engine 332 may be executed by another machine at different configurations.

Processor 312 may comprise user interface 336 for receiving input from a user and providing output from a user using any of I/O devices 308.

Processor 312 may comprise data and control flow module 340 for controlling the loading and activation of modules mentioned above, such that each module is operated with its required input and its output is provided to the correct destination.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving, by a processor, a Sweeney-Robertson-Tocher (SRT) implementation, and a look-up table (LUT) used by the SRT implementation;
dividing, by the processor, entries of the LUT into a plurality of units, wherein each unit comprises entries that correspond to a line of the LUT;
obtaining, by the processor, an assertion for the SRT, the assertion associated with a unit of entries from the LUT, and the unit of entries corresponds to a particular line of the LUT;
verifying, by the processor, the assertion by executing a formal verification engine on the unit of entries corresponding to the particular line and associated with the assertion for the SRT implementation;
subject to the assertion failing, providing, by the processor, a counter example for a computation that when performed by the SRT implementation accesses the unit of entries associated with the assertion;
subject to the assertion holding, determining, by the processor, that the unit of entries associated with the assertion is unreachable by the SRT implementation;
removing, by the processor, the entries determined as unreachable and associated with held assertions from the LUT;
inputting, by the processor, a new LUT to a simulator, wherein the new LUT comprises the unit of entries in the counter example, and excludes the removed unreachable entries; and
executing, by the processor, the simulator on the new LUT to verify a correctness of the LUT.

2. The method of claim 1, further comprising determining, by the processor, the assertion based on a coverage goal or on a requirement.

3. The method of claim 1, wherein the counter example comprises a dividend and a divisor, or a number for which it is required to determine a square root.

4. The method of claim 1, further comprising verifying, by the processor, further assertions for determining further counter examples for the assertion.

5. The method of claim 1, further comprising verifying, by the processor, further assertions for determining coverage of advanced coverage goals.

6. The method of claim 5, wherein the advanced coverage goals comprise at least one goal selected from the group consisting of: verifying, by the processor, that a legal LUT entry is hit on any iteration, and hitting each legal LUT entry with extreme values of operands.

7. The computer-implemented method of claim 1, wherein the new LUT includes empty entries in place of the removed entries such that the new LUT has the same size as the LUT.

8. The computer-implemented method of claim 1, wherein each unit of entries divided from the plurality of units is assigned to a respective formal verification engine.

9. The computer-implemented method of claim 1, wherein the assertion is a unit of assertions comprising multiple assertions related to the particular line.

10. A computerized apparatus having a processor, the processor being adapted to perform the steps of:
receiving a Sweeney-Robertson-Tocher (SRT) implementation, and a look-up table (LUT) used by the SRT implementation;
dividing entries of the LUT into a plurality of units, wherein each unit comprises entries that correspond to a line of the LUT;
obtaining an assertion for the SRT, the assertion associated with a unit of entries from the LUT, and the unit of entries corresponds to a particular line of the LUT;
verifying the assertion by executing a formal verification engine on the unit of entries corresponding to the particular line and associated with the assertion for the SRT implementation;
subject to the assertion failing, providing a counter example for a computation that when performed by the SRT implementation, accesses the units of entries associated with the assertion;
subject to the assertion holding, determining that the unit of entries associated with the assertion is unreachable by the SRT implementation;
removing the entries determined as unreachable and associated with held assertions from the LUT;
inputting a new LUT to a simulator, wherein the new LUT comprises the unit of entries in the counter example, and excludes the removed unreachable entries; and executing the simulator on the new LUT to verify a correctness of the LUT.

11. The apparatus of claim 10, wherein the processor is further adapted for determining the assertion based on a coverage goal or on a requirement.

12. The apparatus of claim 10, wherein the counter example comprises a dividend and a divisor, or a number for which it is required to determine a square root.

13. The apparatus of claim 10, wherein the processor is further adapted for verifying further assertions for determining further counter examples for the assertion.

14. The apparatus of claim 10, wherein the processor is further adapted for verifying further assertions for determining coverage of advanced coverage goals.

15. The apparatus of claim 14, wherein the advanced coverage goals comprise at least one goal selected from the group consisting of: verifying that a legal LUT entry is hit on any iteration, and hitting each legal LUT entry with extreme values of operands.

16. A computer program product comprising a computer readable storage medium including program instructions embodied therewith, the program instructions are executable by a processor to cause the processor to:
   receive a Sweeney-Robertson-Tocher (SRT) implementation, and a look-up table (LUT) used by the SRT implementation;
   divide entries of the LUT into a plurality of units, wherein each unit comprises entries that correspond to a line of the LUT;
   obtain an assertion for the SRT, the assertion associated with a unit of entries from the LUT, and the unit of entries corresponds to a particular line of the LUT;
   verify the assertion by executing a formal verification engine on the unit of entries corresponding to the particular line and associated with the assertion for the SRT implementation;
   subject to the assertion failing, provide a counter example for a computation that when performed by the SRT implementation, accesses the unit of entries associated with the assertion;
   subject to the assertion holding, determine that the unit of entries associated with the assertion is unreachable by the SRT implementation;
   remove the entries determined as unreachable and associated with held assertions from the LUT;
   input a new LUT to a simulator, wherein the new LUT comprises the unit of entries in the counter example, and excludes the removed unreachable entries; and
   execute the simulator on the new LUT to verify a correctness of the LUT.

17. The computer program product of claim 16, wherein the program instructions are further executable by a processor to cause the processor to determine the assertion based on a coverage goal or on a requirement.

18. The computer program product of claim 16, wherein the counter example comprises a dividend and a divisor, or a number for which it is required to determine a square root.

19. The computer program product of claim 16, wherein the program instructions are further executable by a processor to cause the processor to verify further assertions for determining further counter examples for the assertion.

20. The computer program product of claim 16, wherein the program instructions are further executable by a processor to cause the processor to verify further assertions for determining coverage of advanced coverage goals.

* * * * *